US012095910B2

(12) United States Patent
Darshan et al.

(10) Patent No.: US 12,095,910 B2
(45) Date of Patent: Sep. 17, 2024

(54) SYSTEM FOR THIN CLIENT DEVICES IN HYBRID EDGE CLOUD SYSTEMS

(71) Applicant: Synamedia Limited, Staines Upon Thames (GB)

(72) Inventors: Ezra Darshan, Beit Shemesh (IL); Steven Jason Epstein, Hashmonaim (IL); Michal Irit Devir, Haifa (IL); Yosef Tsuria, Jerusalem (IL)

(73) Assignee: SYNAMEDIA LIMITED, Staines Upon Thames (GB)

( * ) Notice: Subject to any disclaimer, the term of this patent is extended or adjusted under 35 U.S.C. 154(b) by 295 days.

(21) Appl. No.: 17/517,485

(22) Filed: Nov. 2, 2021

(65) Prior Publication Data
US 2023/0132485 A1    May 4, 2023

(51) Int. Cl.
*H04L 9/08* (2006.01)
*G06F 21/10* (2013.01)
*H04L 9/32* (2006.01)
*H04L 67/141* (2022.01)

(52) U.S. Cl.
CPC ............ *H04L 9/0866* (2013.01); *G06F 21/10* (2013.01); *H04L 9/0825* (2013.01); *H04L 9/3247* (2013.01); *H04L 9/3271* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 2003/0200458 A1* | 10/2003 | Hori | G06F 21/10 726/20 |
| 2017/0277909 A1* | 9/2017 | Kraemer | G06F 21/10 |
| 2019/0258778 A1* | 8/2019 | Park | H04L 9/0841 |
| 2021/0152543 A1* | 5/2021 | Doshi | H04L 63/102 |
| 2021/0216612 A1* | 7/2021 | Wojcik | H04L 9/3247 |

* cited by examiner

*Primary Examiner* — Brandon Hoffman
(74) *Attorney, Agent, or Firm* — Fernando & Partners, LLP

(57) ABSTRACT

Techniques for enhancing security for thin client devices in hybrid edge cloud systems are described. In accordance with various embodiments, the hybrid system includes a cloud computing platform (e.g., the cloud) and an edge device (e.g., the edge). The cloud extracts key(s) for authentication and session establishment. The cloud also utilizes the key(s) to establish a session between the edge and a client device. The cloud additionally authorizes a content request from the client device for a media content item over the session and extracts a content key upon successful authorization. The edge caches the key(s), obtains the content key at the time of receiving the content request from the client device and transmits the content key and the key(s) with the media content item to the client device.

20 Claims, 13 Drawing Sheets

SYSTEM FOR THIN CLIENT DEVICES IN HYBRID EDGE CLOUD SYSTEMS

TECHNICAL FIELD

The present disclosure relates generally to security in hybrid edge cloud systems and, more specifically, to security for thin client devices in hybrid edge cloud systems.

BACKGROUND

Edge computing is already a reality. Initiatives such as hyperscale computing allow the edge to put just-in-time content packaging close to the client in hybrid edge cloud systems. Robust content security is critical to edge computing. Current security solutions such as multi-digital rights management (multi-DRM) are costly and require heavy resources from both the edge and client devices. Such solutions may not work on thin client devices, e.g., low cost devices with limited capacities.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
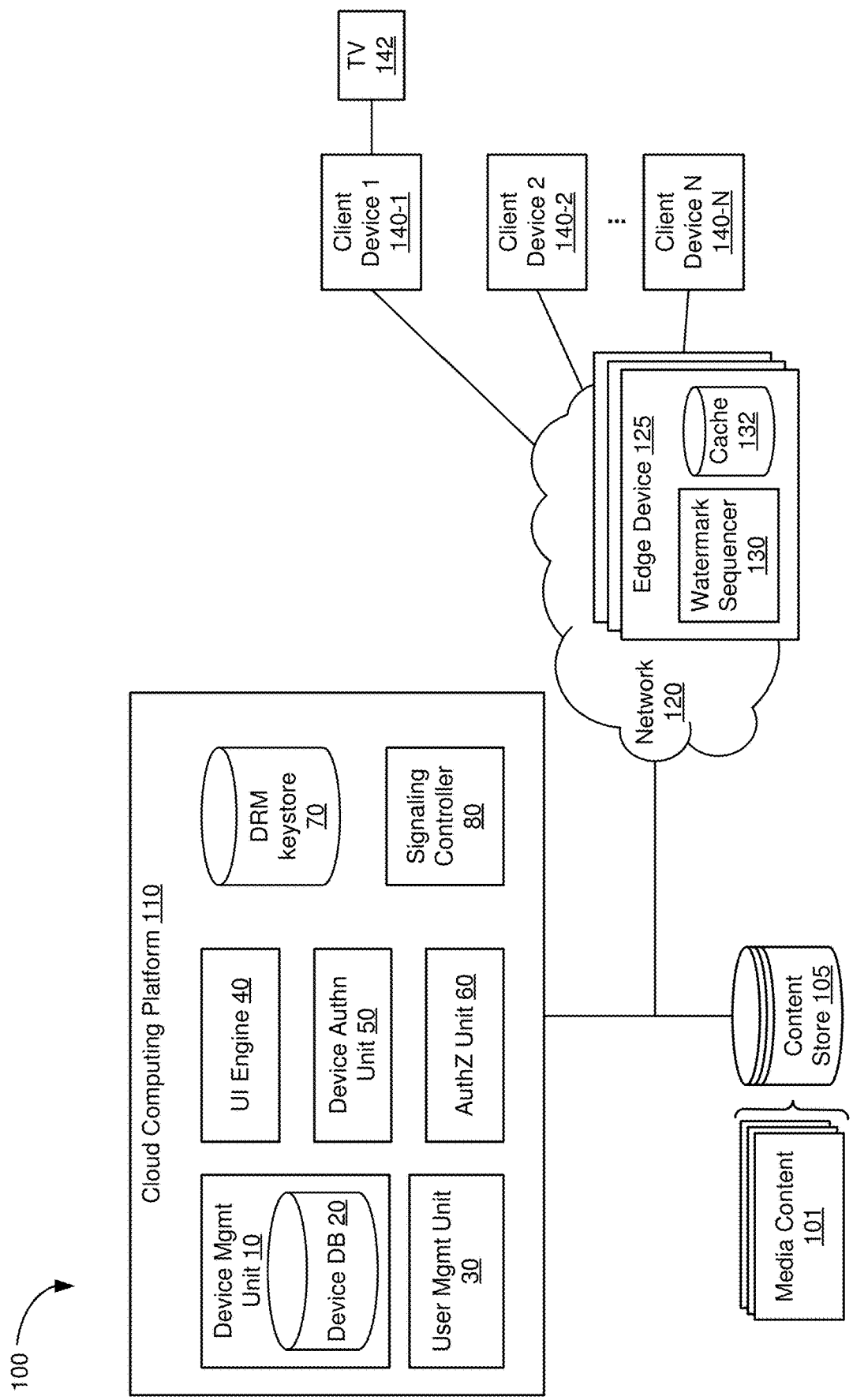
FIG. 1 is a block diagram of an exemplary edge cloud hybrid system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, an edge cloud hybrid system described herein enhances security, prevents attacks, and allows fast recovery. Such attacks include, but are not limited to, theft of service, cloning or impersonation of a legitimate client, theft of content, and/or leakage of content by an authorized user and illegal upload to a pirate distribution mechanism. The security solution in accordance with some embodiments includes a cloud computing platform and an edge device. The cloud computing platform generates and utilizes keys (e.g., key ladder keys) for authentication and authorization based on models maintained in the cloud. In particular, the cloud computing platform uses the keys for secure session establishment. Once a secure session is established, the edge device obtains the keys from the cloud computing platform over the secure session, caches certain keys (e.g., high level key ladder keys) for fast content switching, requests a content key (e.g., a low level key ladder key) at the moment the content is requested, and performs lightweight processes for efficiency. The edge cloud hybrid system described herein thus enables an extensible security framework, balances cost and security, and addresses the aforementioned challenges of meeting the high security requirements from content providers and service providers.

In accordance with various embodiments, a method is performed at one or more servers in a cloud including one or more processors and a non-transitory memory. The method includes extracting one or more keys and authenticating a client device based on the one or more keys. The method further includes assigning an edge device, upon authenticating the client device, to establish a session between the edge device and the client device and cache the one or more keys. The method also includes authorizing the client device in response to a content request from the client device over the session. The method additionally includes extracting a content key associated with the one or more keys upon successful authorization of the content request for the client device.

In accordance with various embodiments, a method is performed at an edge device with one or more processors and a non-transitory memory, where the non-transitory memory stores one or more keys. The method includes receiving a content request for a media content item for a client device, where the content request includes a client identifier associated with the client device. The method also includes obtaining, from a cloud, a content key associated with the one or more keys in response to receiving the content request. The method further includes transmitting the content key and the one or more keys with the media content item to the client device.

Example Embodiments

As described above, many previously existing systems face the challenge of delivering a security solution for thin client devices in hybrid edge cloud systems, especially the challenge of meeting the high security requirements from both content providers and service providers. The security methods, devices, and systems described herein make client processes static to accommodate limited capacities on thin client devices and make edge processes light to ensure speed and efficiency while enabling strong security enforcement in the cloud. Such a system effectively prevents or allows recovery from threats, such as the theft of services, cloning or impersonation of a legitimate client, the theft of content, and/or the leakage of content by authorized users and the illegal uploads by such users to pirate distribution.

Reference is now made to FIG. 1, which is a block diagram of an exemplary edge cloud hybrid system 100 in accordance with some embodiments. In some embodiments, the exemplary system 100 includes a cloud platform 110 (also referred to as the cloud 110) in a core network, edge devices 125 in a network 120 (e.g., in a multi-access edge computing (MEC) environment), and client devices 140, e.g., client device 1 140-1, client device 2 140-2, . . . , client device N 140-N in a radio access network (RAN). In some embodiments, the cloud computing platform 110 includes one or more servers that are communicatively connected to the edge devices 125, and each of the edge devices 125 is further communicatively connected to a set of the client devices 140. In some embodiments, the cloud computing platform 110 further includes a device management unit 10, a device database 20, a user management unit 30, a user interface (UI) engine 40, a device authentication unit 50, an authorization unit 60, a digital rights management (DRM) keystore 70, and a signaling controller 80 for providing secure access to data delivered to the client devices 140 via the network 120. In some embodiments, a respective edge device 125 further includes a watermark sequencer 130 for watermark embedding and a cache 132 for caching content and/or keys.

In some embodiments, the network 120 is an edge environment, and each of the edge devices 125 is an edge node in the edge environment that prepares data for delivery to a set of client devices 140. In some embodiments, a respective client device 140 is a thin client device, e.g., a low cost set-top-box (STB) with a processor and a non-transitory memory as storage. In some embodiments, the client device 140 is operative to interface with a display device such as a TV, e.g., client device 1 140-1 connected to, coupled with, or paired with a TV 142, so that decoded audio-visual content is sent to the TV 142 and displayed on the TV 142. In some embodiments, the TV 142 is high-bandwidth digital content protection (HDCP) capable that can protect unauthorized duplication of high definition (HD) audio-visual content.

In some embodiments, the data delivered to the client devices 140 are originated from a content store 105 (e.g., the origin), which stores and/or provides media content 101. In some embodiments, the cloud computing platform 110 and/or the edge device(s) 125 obtain the data from the content store 105 and processes the media content 101 prior to delivering the media content 101 to the client devices 140. In some embodiments, the media content 101 (also referred to as "multimedia content", "a media content item", "content", or "a content item") includes, but is not limited to, video and/or audio. As such, in the exemplary hybrid edge cloud system 100, various server-side components, e.g., components on the cloud computing platform 110 and/or on the edge device(s) 125, provide content services.

In the cloud computing platform 110, the device management unit 10 manages the client devices 140 and stores information about the client devices 140 and the services associated with the client devices 140, e.g., generating and/or storing client identifiers, device keys, and/or secrets for authentication, etc. in the device database 20. In some embodiments, the user management unit 30 manages registered users (e.g., subscribers), who use the client devices 140 to access services and/or the media content 101. To manage the content, the services, and/or the users, the cloud computing platform 110 maintains models for each subscriber, such as subscriptions, tiers in tiered subscription services, entitlements to certain content, rental privileges, loan limits, online purchase agreements, and/or gift amount, etc. Such models, as will be described in further detail below, are securely stored and maintained by the cloud 110 and changes to the models are applied to the content and/or services offered to the users in real time.

In some embodiments, the UI engine 40 is operative to provide the client devices 140 user interfaces such as an electronic program guide (EPG), a media player user interface, and/or a home screen, etc. In some embodiments, the device authentication unit 50 authenticates clients, e.g., the client devices 140. In some embodiments, the authorization unit 60 grants to the client devices authorizations to access content, e.g., constructing and providing an access token upon successful authentication. In some embodiments, the DRM keystore 70 maintains DRM keys for DRM protected content, e.g., storing content keys based on content identifiers (IDs). In some embodiments, the signaling controller 80 communicates signaling and control information between the client devices 140 and other parts of the system 100 for purposes such as navigation and/or viewing content.

The edge device 125, in some embodiments, provides content to a respective client device 140 and is located at an edge facility, e.g., in a content distribution network (CDN), to optimize content delivery. In some embodiments, the watermark sequencer 130 embeds a watermark within the content that is specific to parameters provided to the edge device 125, e.g., a device identifier (ID) and/or an edge ID.

As will be described in further detail below, in the exemplary system 100, the cloud computing platform 110 generates keys and uses the keys to enforce extensible models (e.g., models encapsulating business rules). Such enforcement does not require changes on the client side and does not involve the client devices 140 checking the rules, thus ensuring enhanced and extensible security on thin client devices. The content and/or the keys are encrypted end-to-end, so that the edge device 125 does not perform computationally intensive tasks, e.g., re-encryption, thus keeping the processes on the edge device 125 light. Further, when the edge device 125 caches one or more encrypted keys for active sessions, the encrypted keys are securely stored in the cache 132. The key caching improves efficiency and reduces latency and traffic to the cloud computing platform 110. Additionally, in some embodiments, the edge device 125 sends the encrypted keys just-in-time (JIT) in-band with the content stream (e.g., in a real-time transport protocol (RTP) stream and/or a secure real-time transport protocol (SRTP) stream), thus allowing simple and deterministic processing by the thin client device 140.

It should be noted that the exemplary system 100 is by way of example. On the cloud computing platform 110, for example, additional components such as network interface(s) and/or encryptor(s) are not shown. Further, the device management unit 10, the device database 20, the user management unit 30, the UI engine 40, the device authentication unit 50, the authorization unit 60, the DRM keystore 70, and/or the signaling controller 80 can be combined or separated, executed by one or more processors, and/or co-located on one server or distributed over multiple servers. Likewise, the edge device 125 can include different and/or additional components, and the watermark sequencer 130 on the edge device 125 can be executed by one or more processors. Moreover, the techniques described herein are not limited to any particular protocol (e.g., network transmission protocols), cryptographic method (e.g., symmetric cryptography or asymmetric cryptography), and/or standards (e.g., 5G or other cellular networks, satellite, cable, internet protocol (IP), and/or local network, etc.).

Figure 2:
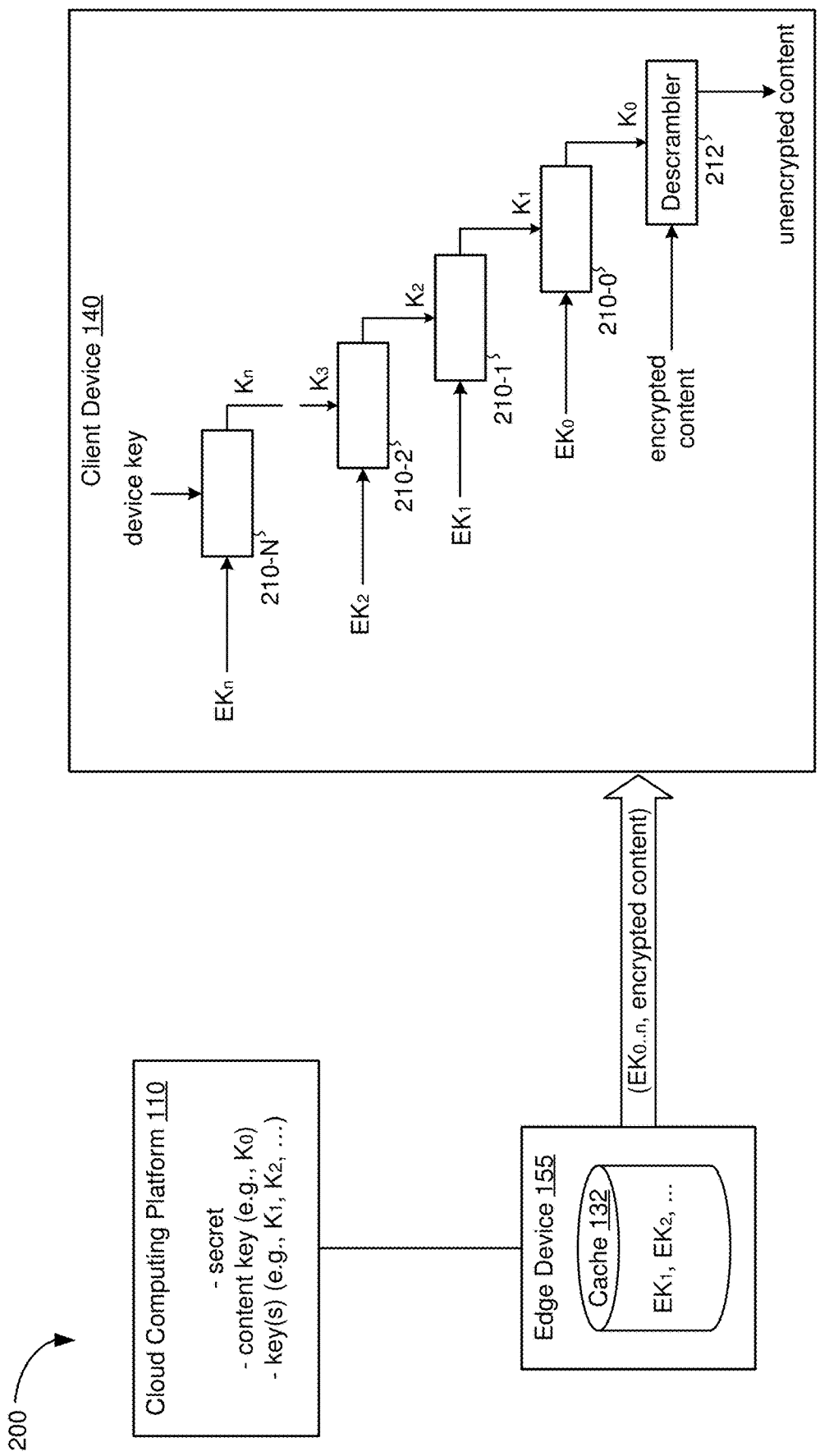
FIG. 2 is a diagram illustrating using keys in the exemplary edge cloud hybrid system, in accordance with some embodiments.

FIG. 2 is a diagram 200 illustrating using keys in the exemplary system 100 for enhanced security, in accordance with some embodiments. In some embodiments, the cloud computing platform 110 generates and/or stores keys for each of the client devices 140 according to its entitlements. In some embodiments, the keys are key ladder keys. As used herein, a key ladder is a generic cryptographic construction and it is often used in the content distribution domain. Typically, the key ladder comprises chaining of keyed cryptographic operations, such that each one of those operations gets its key from the output of a previous operation. The final level of the key ladder typically outputs its result out of the key ladder for general use, e.g., for decrypting the encrypted content, and the intermediate levels generate varying levels of intermediate key ladder keys, e.g., as provided by different entities and/or is project specific.

It should be noted that the use of key ladder keys for enhanced security is by way of example. Other types of keys can be used in place of, or in conjunction with, the key ladder keys. For example, the cloud computing platform 110 can use a symmetric cryptographic key which is not part of a key ladder for authentication and/or authorization. In some embodiments, the cloud computing platform 110 uses an asymmetric key pair in place of key ladder keys. In such embodiments, the client device 140 stores the private key in the key pair, while the cloud computing platform 110 and/or the edge device 125 store the public key and the association of the asymmetric key pair to a corresponding client device 140.

In some embodiments, the cloud computing platform 110 stores the keys in one or more datastores, e.g., storing a content key corresponding to a content ID as a low level ladder key $K_0$, in the DRM keystore 70 (FIG. 1) and storing high level key ladder keys $K_1$ and $K_2$, with $K_2$ being a higher level than $K_1$ (and/or $K_3$ and $K_4$ for specific projects), in the device database 20 (FIG. 1) according to the device ID. The keys are stored encrypted or unencrypted in accordance with various embodiments. The cloud computing platform 110 is the most appropriate location for storing such keys because it serves a plurality of client devices 140 and has tighter security controls, e.g., physical device security, protection, and/or isolation. In some embodiments, in addition to the keys, the cloud computing platform 110 also generates and/or stores a secret embedded in each key ladder, where the secret is stored separately from the key ladder keys. As will be described in further detail below, in some embodiments, when a client device 140 connects for the first time, the cloud computing platform 110 authenticates the client device 140 using a challenge response protocol that is based on the secret for enhanced security.

In some embodiments, an edge process on the edge device 125 that is assigned to serve one or more client devices 140 obtains from the cloud computing platform 110 encrypted high level key ladder keys and caches the high level key ladder keys, e.g., storing $EK_1$, $EK_2$, etc. in the cache 132. Because each edge process serves one or a few client devices, the caching is simple and lightweight. As will be described in further detail below, in some embodiments, in response to a content request from the client device 140, the edge process retrieves the content with its original encryption and re-packages it in a format that is suitable for the client device 140 (e.g., as an RTP stream) without re-encryption. Not performing resource intensive tasks such as re-encryption allows the edge process to be lightweight. At the time of responding to the content request, the edge process also obtains from the cloud computing platform 110 the content encryption key ($K_0$), e.g., encrypted for the key ladder corresponding to a particular client device 140 ($EK_0$). Upon receiving $EK_0$, the edge process sends the key ladder keys ($EK_0$, $EK_1$, ..., $EK_E$) in-band to the client device 140 before the encrypted content packets in accordance with some embodiments. Transmitting the keys in-band along with the content allow seamless transitions between different pieces of content or between UI and content. In some other embodiments, at least some of the encrypted decryption keys, e.g., $EK_1$, $EK_2$, ..., $EK_n$, are provided to the client device 140 out-of-band, e.g., in an entitlement control message (ECM) and/or an entitlement management message (EMM).

In some embodiments, the client device 140 has a secure anchor for key management, such as a key ladder serialized in production, or a trusted execution environment (TEE). In some embodiments, the client device 140 also has secure decryption and decoding environment, such as a descrambler 212 integrated with the key ladder, and a secure media path. In FIG. 2, the client device 140, upon receiving the keys and the encrypted content, uses a plurality of decryptors 210-0, 210-1, 210-2, ..., 210-N (collectively referred to hereinafter as the plurality of decryptors 210) to decode the key ladder keys at multiple levels.

For example, the decryptor 210-0 receives $K_1$ from the decryptor 210-1 and uses $K_1$ to decrypt $EK_0$. To generate $K_1$, the decryptor 210-1 receives $K_2$ from the decryptor 210-2 and uses $K_2$ to decrypt $EK_1$, and so on. Likewise, to generate $K_n$, the decryptor 210-N uses a device key associated with the client device 140 to decrypt $EK_n$. The output $K_0$ from the decryptor 210-0 is provided to the descrambler 212 to decrypt the encrypted content and generate unencrypted content, which is then provided to a display device (e.g., the TV 142, FIG. 1) for display in accordance with some embodiments.

In some embodiments, a respective decryptor 210 includes hardware logic circuits, in the form of an application-specific integrated circuit (ASIC), field programmable gate array (FPGA), or full-custom integrated circuit, or a combination of such devices. Alternatively or additionally, at least some of the cryptographic operations performed by the decryptor 210 are carried out by a programmable processor, such as a microprocessor or digital signal processor, under the control of suitable instructions, which are downloadable to the processor in electronic form, over a network, and/or stored on tangible storage media, such as optical, magnetic, or electronic memory media. It should be noted that the plurality of decryptors 210 can be separate or combined. In some embodiments, each of the plurality of decryptors 210 is a separate unit, while in some other embodiments, one than one decryptor can be combined as one hardware decryptor to perform more than one decryption step.

Figure 3:
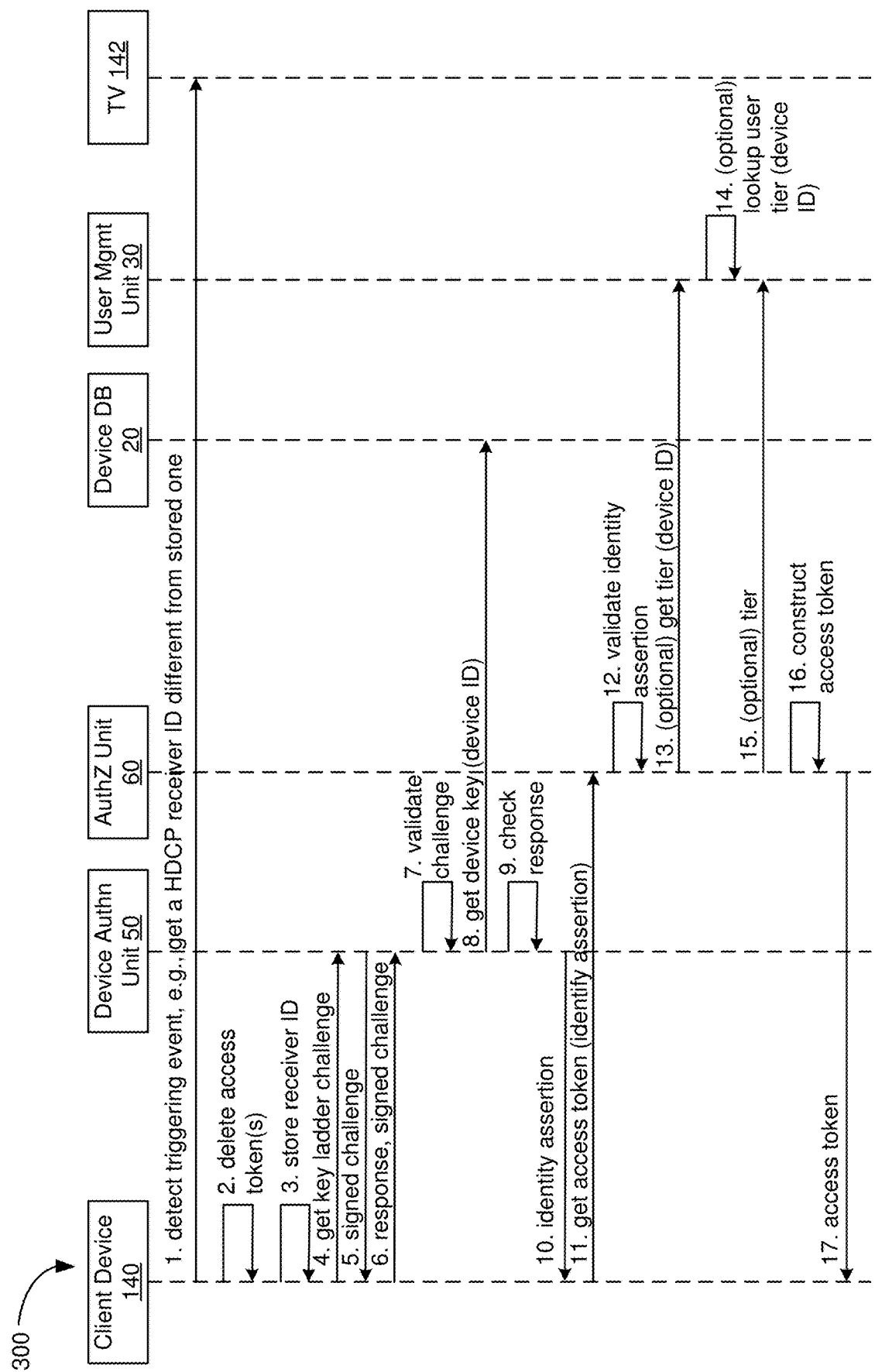
FIG. 3 is a sequence diagram illustrating utilizing keys for authentication, in accordance with some embodiments.

FIG. 3 is a sequence diagram 300 illustrating utilizing keys for authentication in accordance with some embodiments. In some embodiments, when a respective client device 140 connects for the first time, the cloud computing platform 110 (FIG. 1) performs authentication using a challenge response protocol. In some embodiments, the challenge response protocol is based on a secret embedded in the key ladder for the client device, e.g., the secret stored in the cloud platform 110 as shown in FIG. 2. As a result of the authentication, the client device 140 obtains an identity assertion and then an authorization token, e.g., using methods such as open authorization 2 (OAuth2). Leveraging the keys, the cloud computing platform securely identifies the client device 140 and its entitlements. In some embodiments, the authentication process is triggered by events such as the client device 140 changing a pairing display device, the time elapsed since a previous authentication exceeding a threshold, the client device 140 presenting an invalid token, the client device 140 requesting a duplicate session when another session is already in progress, and/or an external entity requesting authentication (e.g., a system administrator issues an authentication command or request), etc.

For example, in step 1, when the client device 140 is paired with the TV 142, the client device 140 obtains an HDCP receiver identifier (ID) associated with the TV 142. Upon detecting that the HDCP receiver ID is different from a pairing device ID stored on the client device 140, e.g., the STB is connected to a new TV, in step 2, the client device 140 deletes existing access token(s) from its storage. As used herein, an access token (also referred to as an authorization token) includes the information about the client device 140 (e.g., an identity associated with the client device 140) as well as the authorizations and/or entitlements associated with the client device 140. The access token carries the client information, the authorizations, and/or the entitlements from the authentication stage to the resource access stage, where the access token is presented to gain access to resources. In some embodiments, in step 3, the client device 140 stores the information, such as the receiver ID obtained in step 1, for determining the next triggering event.

Starting from step 4, the client device 140 follows the challenge response protocol by first requesting a key ladder challenge from the device authentication unit 50. In step 5, in some embodiments, the device authentication unit 50 sends a signed challenge to the client device 140 in response to receiving the request for the challenge. In some embodiments, the key ladder challenge includes a secret, e.g., a randomized number embedded in the key ladder and associated with the key ladder keys. Further, in step 6, the client device 140 sends a response along with the signed challenge to the device authentication unit 50 for validation in step 7. In step 8, in order to validate the response, the device authentication unit obtains from the device database 20 a device key corresponding to a device ID of the client device 140. Using the device key, in step 9, the device authentication unit 50 checks the response received from the client device 140 in step 6, e.g., by independently computing the response as a function of the secret and the device key and comparing with the response from the client device 140.

It should be noted that any cryptographic operations, schemes, and/or systems, e.g., symmetric and/or asymmetric, can be used in the challenge response protocol. For example, in an asymmetric key encryption scheme, using a private key, the device authentication unit 50 signs the key ladder challenge before sending the signed key ladder challenge to the client device 140 in step 5. In step 7, the device authentication unit 50 uses a public key to validate or verify the signed key ladder challenge. Upon receiving the key ladder challenge, the client device 140 retrieves a device key stored on the client device 140, e.g., a device key that is generated by the device authentication unit 50 based on a client identifier associated with the client device 140 and sent to the client device 140. In a symmetric key encryption scheme, the client device 140 uses the device key to compute the response, and the device authentication unit 50 uses the device key obtained from the device database 20 to independently compute the response. Further, the device authentication unit 50 checks the response in step 9 by comparing the computed response with the expected response from the client device 140. In some embodiments, a match of the two responses indicates successful authentication.

In some embodiments, to prepare for session establishment, the device authentication unit 50 sends an identity assertion object to the client device 140 in step 10, and the client device 140 sends the identity assertion object to the authorization unit 60 to request an access token in step 11. In some embodiments, the communication between the client device 140 and the authorization unit 60 is protected with secure protocols, e.g., using transport layer security (TLS) as an encryption protocol to protect the identity assertion object. As used herein, an identity assertion object (also referred to as "an identity assertion", "an assertion", "an assertion object", or "a client assertion") is a package of information that facilitates the sharing of identity and security information across multiple security domains. In some embodiments, the identity assertion object is used as part of the OAuth flow, in which a client (e.g., the client device 140) requests an authorization token from an authorization server (e.g., the authorization unit 60) and provides in the request an authorization grant received from the entity that authenticated and/or approved the client identity (e.g., the device authentication unit 50). In such embodiments, the identity assertion object is created by an entity such as the device authentication unit 50 that validates the client information so that the authorization unit 60 can subsequently validate the client.

In step 12, the authorization unit 60 validates the identity assertion object. Upon successful validation, the authorization unit 60 requests subscription information from the user management unit 30, e.g., subscription(s), entitlements, tiers, rental privileges, loan limits, online purchase agreements, and/or gift amount associated with the device ID in step 13. In step 14, the user management unit 30 locates the subscription information based on the client identifier, such as the device ID, and sends the subscription information to the authorization unit 60 in step 15. In step 16, the authorization unit 60 constructs the access token for the client, e.g., based on the device ID and optionally based on the subscription or tier information. In step 17, the authorization unit 60 sends the granted access token to the client device 140 for session establishment.

It should be noted that the steps illustrated in and described with reference to FIG. 3 are not mandatory and thus some are optional and can be omitted in some embodiments. For example, steps 13-15 can be performed to prevent targeted denial-of-service (DoS) attacks. In some embodiments, these steps are omitted in the authentication process such that in step 16, the authorization unit 60 constructs the access token based on the client identifier (e.g., the device ID) and not depending on the subscription or tier information. Further, some embodiments can include further or different steps beyond those illustrated in the sequence diagram 300. For example, for loans and rentals, the client device 140 uses multiple keys for authorizations of content loans and rentals. Accordingly, in addition to the steps shown in FIG. 3, the edge device 125 returns to the cloud computing platform at a later time to ensure the authorization still applies, e.g., checking whether the access token is still valid and/or has not expired. In the case of the access token being expired, an error message (e.g., rental expired) is generated and provided to the client device 140.

Figure 4:
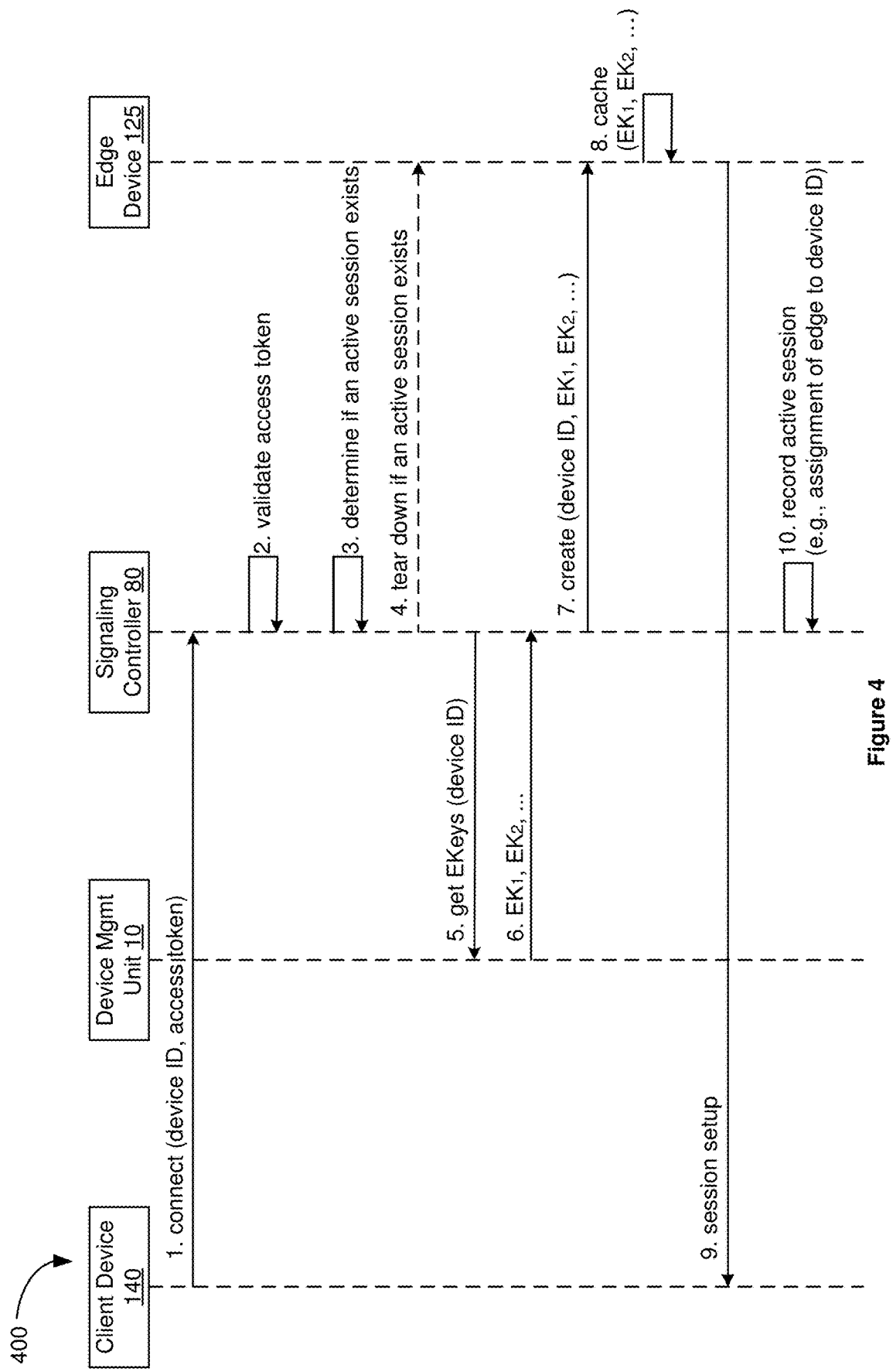
FIG. 4 is a sequence diagram illustrating session establishment, in accordance with some embodiments.

FIG. 4 is a sequence diagram 400 illustrating session establishment in accordance with some embodiments. In some embodiments, in step 1, to establish a session, the client device 140 sends to the signaling controller 80 a connect request with the client identifier (e.g., device ID) as well as the access token. In step 2, the signaling controller 80 validates the access token, and in step 3, the signaling controller 80 determines whether an active session associated with the client device 140 already exists. In step 4, the signaling controller 80 tears down the active session upon identifying the existence of an active session associated with the client device 140.

Figure 5:
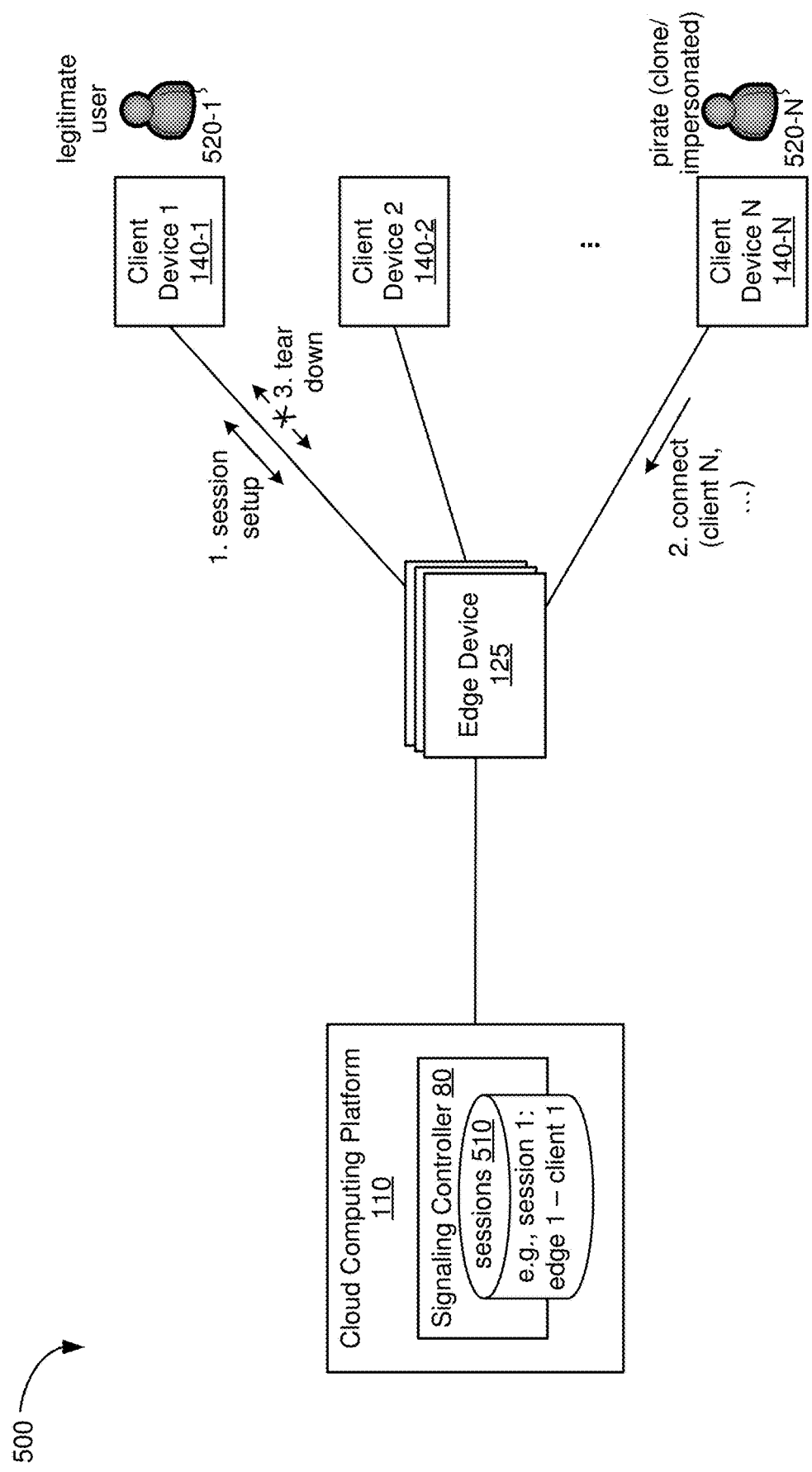
FIG. 5 is a diagram illustrating detecting and preventing cloning or impersonation of a legitimate client, in accordance with some embodiments.

For example, FIG. 5 is a diagram 500 illustrating tearing down an existing session to prevent cloning or impersonation of a legitimate client, in accordance with some embodiments. In some embodiments, the signaling controller 80 includes a sessions datastore 510 for storing assignments of active sessions. After a session is established, e.g., setting up a session between client device 1 140-1 and one of the edge devices 125, the signaling controller 80 stores a record in the sessions datastore 510 representing the assignment of an edge process and/or an edge device to client device 1 140-1 for the active session, e.g., edge 1 is assigned to service client 1 in session 1. When client device N 140-N connects and requests a session, the signaling controller 80 checks whether there is an existing session for client device N 140-N. In the case of a pirate 520-N using client device N 140-N to clone or impersonate a legitimate user 520-1 and/or client device 1 140-1, the signaling controller 80 locates the active session record in the sessions datastore 510 and tears down the existing session between the assigned edge process (and/or the assigned edge device 125) and client device 1 140-1.

Tearing down an existing session effectively disables cloning of client device 1 140-1 or impersonation of the legitimate user 520-1. The legitimate user 520-1, whose session has just been unceremoniously terminated, would reconnect and cause the session with client device N 140-N to be terminated. After repeated connecting, disconnecting, and re-connecting, the legitimate user 520-1 may report to the service provider, who can take actions to stop the attempted piracy, e.g., whitelisting the IP of the legitimate user 520-1, blacklisting the compromised client device N 140-N, and/or issuing a new access token.

Referring back to FIG. 4, in step 5, upon determining that there is no existing active session assigned to the client device 140, the signaling controller 80 requests encrypted keys for the client device 140 from the device management unit 10, e.g., by providing the device ID of the client device 140 to the device management unit 10. The device management unit 10 extracts the high level key ladder keys for the client device 140, e.g., $EK_1$, $EK_2$, ..., and sends them to the signaling controller 80 in step 6. In some embodiments, one or more of the high level key ladder keys are generated based on the content, the client device 140, the user, and/or the business model.

In some embodiments, the signaling controller 80 then creates the session by assigning an edge process on a respective edge device 125 to the client device 140, e.g., issuing a create command and sending the device ID of the client device 140 and the high level key ladder keys to the assigned edge device 125 in step 7. As such, the cloud extracts the high level key ladder keys according to the access granted to the client device 140 (e.g., upon successful authentication following the steps in FIG. 3 and based on the access token granted to the client device 140 indicating the entitlement and/or subscription information) and provides the extracted high level key ladder keys to the edge device 125 for caching. To minimize the delay when switching between content items, the assigned edge process obtains the high level key ladder keys for the client device 140 and caches such keys in step 8. Because the assigned edge process serves one or a few client devices 140, the caching is simple and lightweight.

In step 9, the assigned edge process sets up a session between the client device 140 and the edge device 125, e.g., establishing a secure Web Real-Time Communication (WebRTC) session. In step 10, the signaling controller 80 records the active session, e.g., recording the assignment of the edge 125 and/or the edge process to the device ID of the client device 140 in the sessions datastore 510 as shown in FIG. 5. The recorded session can then be used to check the existence of duplicate session requests for detecting and preventing cloning and/or impersonation.

Figure 6:
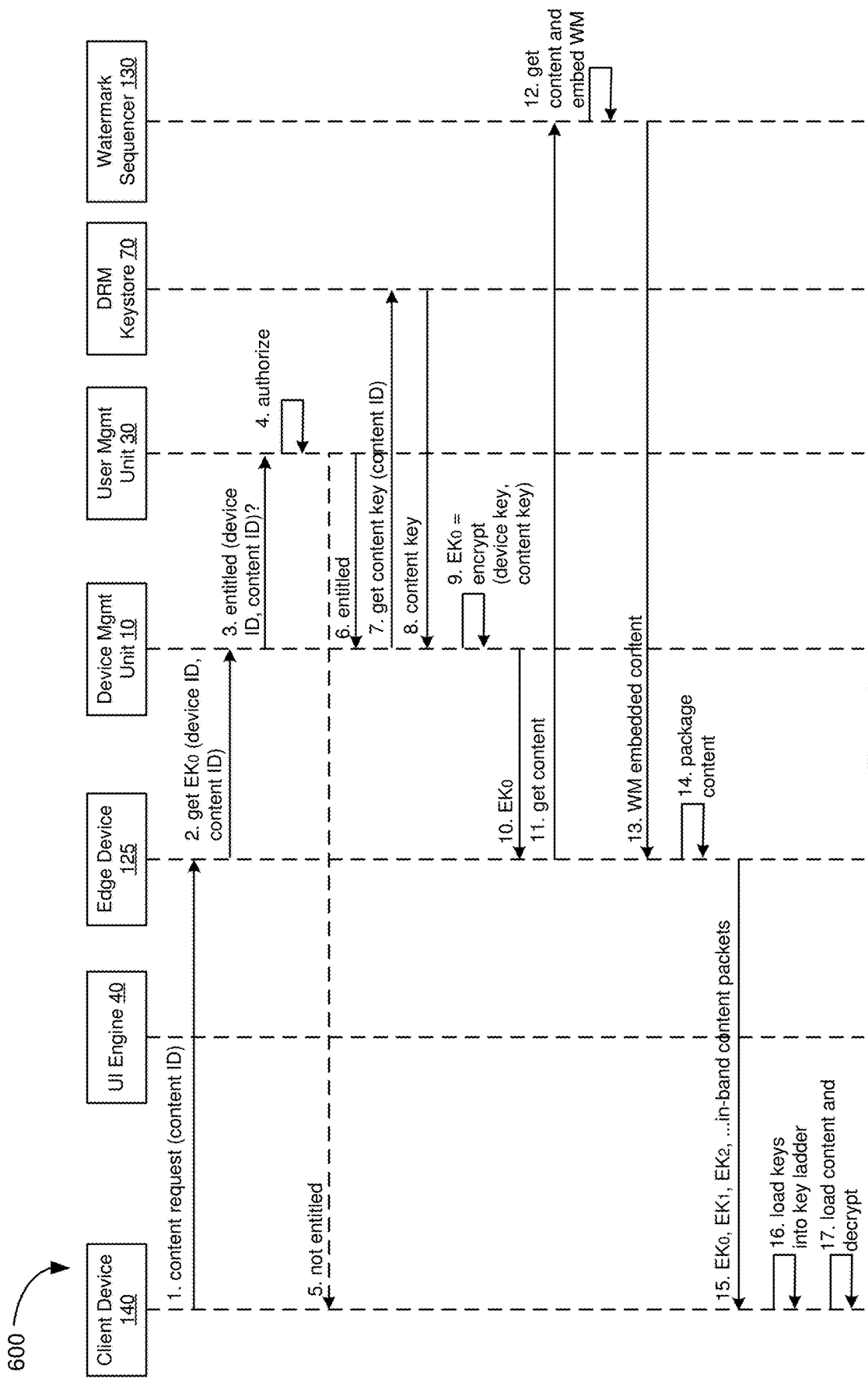
FIG. 6 is a sequence diagram illustrating utilizing keys for authorization and content protection, in accordance with some embodiments.

FIG. 6 is a sequence diagram 600 illustrating using keys for authorization and content protection, in accordance with some embodiments. In some embodiments, when the user selects a content item via the client device 140, in step 1, the client device 140 sends a content request that includes a content ID of the requested content and a client ID (e.g., the device ID of the client device 140) over the established active session. For example, the client device 140 detects a key press when a tile representing a media content item is in focus on a displayed UI. The client device 140 sends the key press input to the UI engine 40, which interprets the key press as selecting the media content item and obtains the content ID of the media content item. The UI engine 40 then sends a view content request to the edge device 140 to initiate the switching from streaming UIs to streaming the requested media content item in accordance with some embodiments. As such, in step 1, the request received by the edge device 125 comes from the UI engine 40 in some embodiments.

In step 2, in response to the content request, the assigned edge process on the edge device 125 requests an encrypted content key from the device management unit 10 by sending the device ID and the content ID along with the request in some embodiments. In some embodiments, in step 3, the device management unit 10 sends a request (e.g., including the content ID and the device ID) to the user management unit 30 for determining whether the client is entitled to the content. In step 4, the user management unit 30 authorizes the request. To authorize the request, for example, the user management unit 30 maps the device ID to locate the corresponding user ID (or the subscriber ID), maps the user ID and the content ID to the tier ID, and then checks whether the user ID is entitled to the tier ID. In some embodiments, instead of or in addition to mapping to the tier ID, the user ID and the content ID are mapped to other identifiers according to different models, such as identifiers associated with rental privileges, loan limits, online purchase agreements, and/or gift amounts. In such embodiments, in step 4, the user management unit 30 checks the user entitlement against content access criteria according to various models, e.g., against the loan model, the purchase model, the tiered subscription model, etc.

In step 5, upon determining that the user is not entitled to the content, the user management unit 30 generates a message indicating non-entitlement and sends the message to the client device 140 via the device management unit 10 and the edge device 125. On the other hand, starting in step 6, upon determining that the user is entitled to the content, the user management unit 30 generates a message indicating the entitlement to the device management unit 10. In some embodiments, the device management unit 10, in response to receiving the indication of entitlement, requests a content key corresponding to the content ID, e.g., $K_0$, from the DRM keystore 70 in step 7. In step 8, the DRM keystore 70 retrieves the content key based on the content ID and returns the content key to the device management unit 10. In step 9, the device management unit 10 encrypts the content key, e.g., using the device key generated based on the device ID and the content key $E_0$ as the inputs to generate $EK_0$. The device management unit 10 then sends the encrypted content key to the edge device 125 in step 10.

Figure 7A:
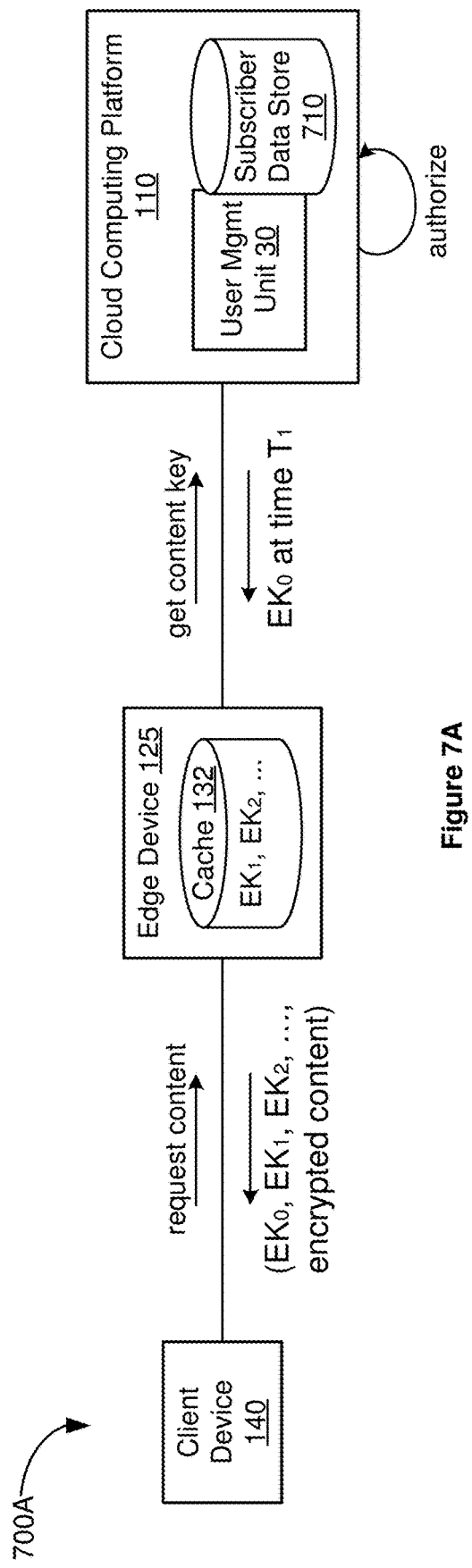
FIGS. 7A and 7B are diagrams illustrating real time authorization at the time of content acquisition, in accordance with some embodiments.
Figure 7B:
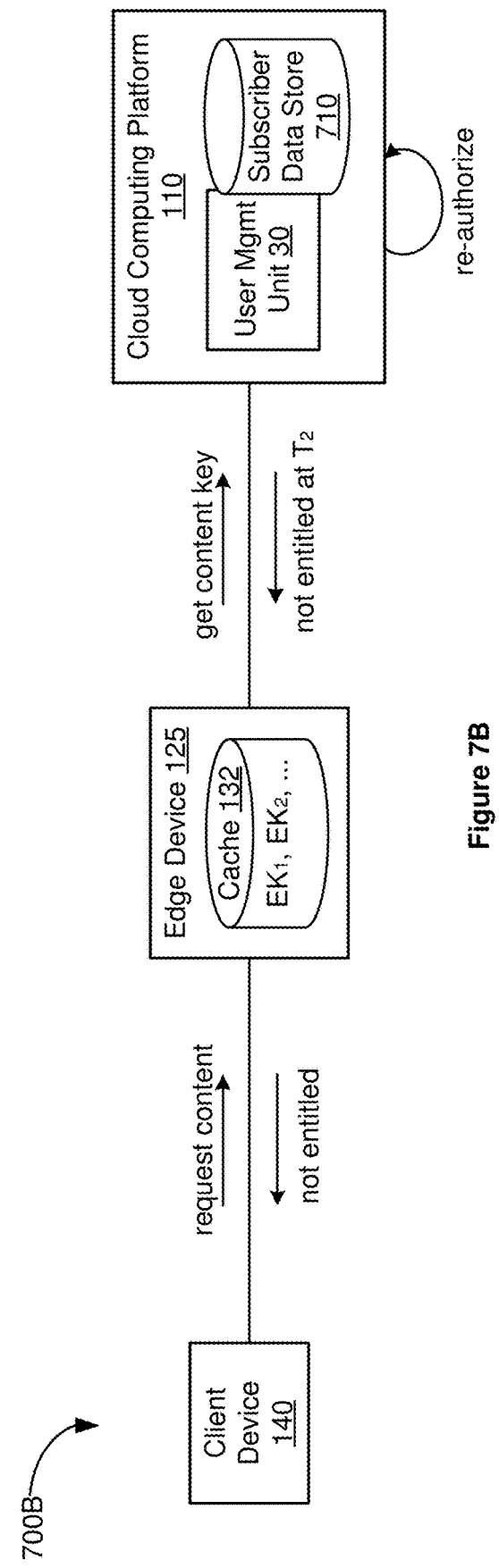

Requesting the content key by the edge device 125 at the moment the content is requested by the client device 140 allows checking access conditions in real time, e.g., at the time of the access. For example, FIGS. 7A and 7B are diagrams 700A and 700B illustrating providing different content in response to subscription updates in the cloud. In some embodiments, a subscriber data store 710 stores subscriber data, including but is not limited to the mapping between the users, the devices, and/or the tiers. As such, the user management unit 30 can perform the authorization according to any model(s) for each subscriber and manage the subscriber data in the cloud computing platform 110, e.g., tiered subscription authorization, rental, loan, online purchase, and/or gift, etc.

In FIG. 7A, when the client device 140 requests content (e.g., via the UI engine 40 as shown in step 1 of FIG. 6 and described above), the edge device 125 requests the content key from the cloud computing platform 110. At the time of the edge device 125 requesting the content key for the client device 140, the user management unit 30 in the cloud computing platform 110 performs the authorization based on the information stored in the subscriber data store 710. Having determined the entitlement as described in FIG. 6, the cloud computing platform 110 sends the edge device 125 $EK_0$ at time $T_1$. The edge device then packages the key ladder keys, including the cached high level key ladder keys, along with the encrypted content and sends them to the client device 140 over the established session. The client device 140 can then use the key ladder keys $EK_0$, $EK_1$, $EK_2$, ... to decrypt the content for rendering as shown and described above with reference to FIG. 2.

In comparison, in FIG. 7B, when the client device 140 requests the same content (e.g., via the UI engine 40 as shown in step 1 of FIG. 6 and described above) at a different time, based on the updated subscriber data at time $T_2$, the cloud computing platform 110 re-authorizes the client device 140 and determines that the client is not entitled to the content, e.g., due to a subscription downgrade or termination. Accordingly, the content would not be provided to the client device 140. Instead, the cloud computing platform 110, via the edge device 125, sends to the client device 140 over the active session a message indicating the non-entitlement.

As shown in FIGS. 7A and 7B, requesting the same content, the client device 140 receives messages at time $T_1$ and $T_2$ according to the real time entitlement information maintained in the cloud computing platform 110. As such, performing the authorization and checking the entitlement at the time of the client requesting the content enable the enforcement of business model changes in real time, e.g., more or less content based on subscription upgrades or downgrades and/or revocation of permission upon detecting piracy.

Referring back to FIG. 6, in step 11, the edge process on the edge device 125 requests the content. In some embodiments, the edge process does not access the content store directly. Instead, the request is proxied through the watermark sequencer 130, where the watermark sequencer 130 retrieves the content (e.g., in chunks) and embeds watermarks in step 12 before returning the watermarked content to (e.g., in watermark embedded chunks) the edge device 125 in step 13. In some embodiments, the watermark sequencer 130 is operative to choose different content chunks in accordance with the encoding of the watermark value. In some embodiments, the watermark value depends partly on the device ID of the client device 140 and partly on the edge ID of the edge device 125, e.g., embedding both the client ID and the edge ID in the media content item. This allows watermark tracing in the case of a particular edge device being compromised.

Figure 8:
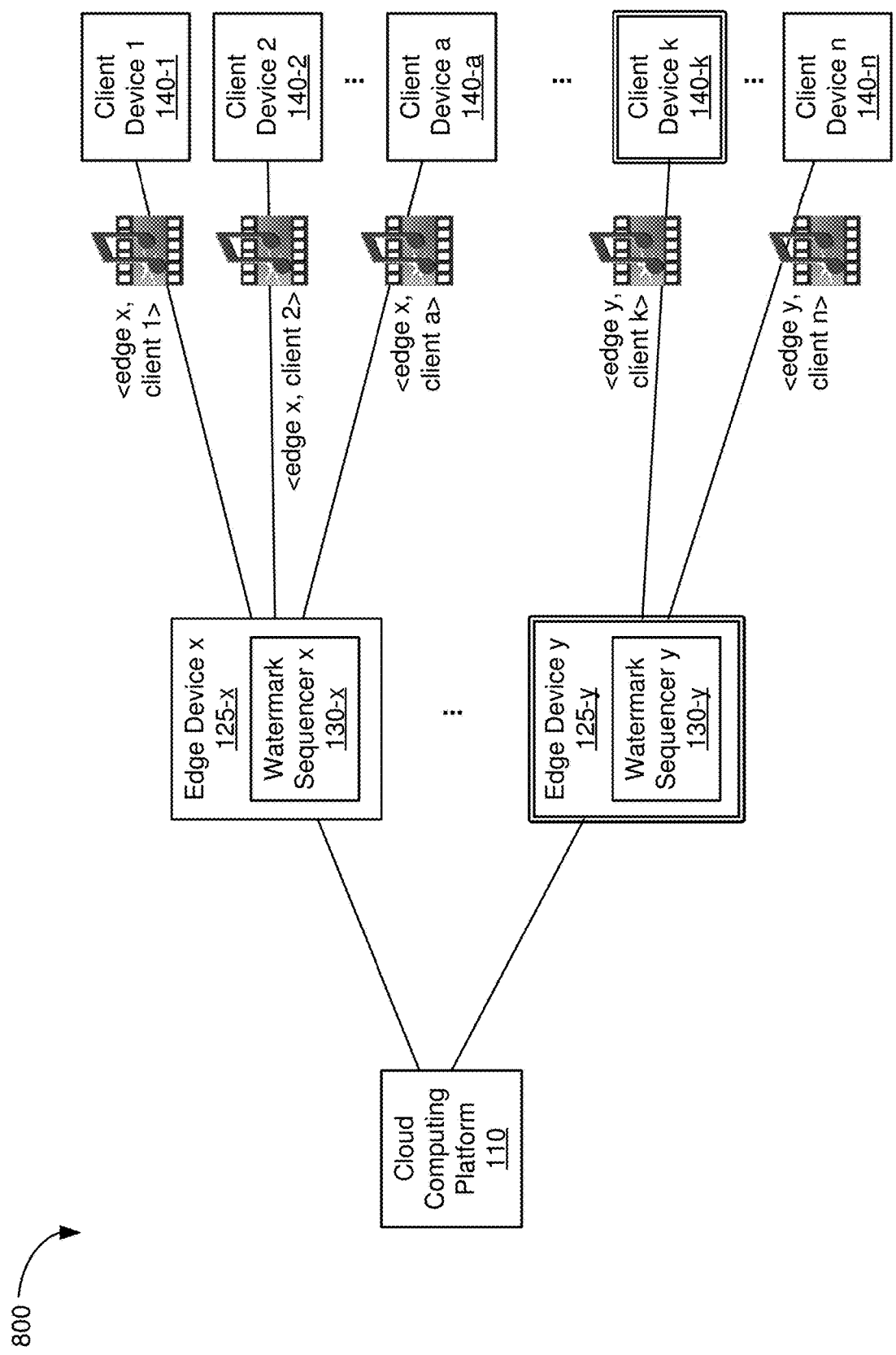
FIG. 8 is a diagram illustrating watermark embedding for leaked content identification, in accordance with some embodiments.

For example, FIG. 8 is a diagram 800 illustrating watermark embedding in the exemplary system 100 in accordance with some embodiments. The exemplary system includes edge device x 125-x assigned to a first set of client devices 140-1, 140-2, ..., 140-a and edge device y 125-y assigned to a second set of claim devices 140-k ... 140-n. Edge device x 125-x includes watermark sequencer x 130-x for embedding watermarks in the content requested by client devices 140-1, 140-2, ..., 140-a. Edge device y 125-y includes watermark sequencer y 130-y for embedding watermarks in the content requested by client devices 140-k ..., 140-n. In the case of the watermarks being tampered with, the cloud computing platform 110 can detect whether the particular client device k 140-k alone is being compromised or edge device y 125-y is being compromised by analyzing the edge ID and the device ID in the watermarks. For instance, upon identifying a tampered watermark with the device ID of client device k 140-k in a media content item, client device k 140-k is identified as being compromised, as indicated by the double-lined borders in FIG. 8.

In some embodiments, the identification of a compromised client device triggers or causes watermark tracing of edge devices. For example, upon obtaining multiple copies of the media content item, and identifying the edge ID of edge device y 125-y in the multiple copies, edge device y 125-y can be traced by the cloud computing platform 110 as being compromised, as indicated by the double-lined borders in FIG. 8. In some embodiments, the cloud computing platform 110 proactively protects other client devices assigned to edge device y 125-y, e.g., by reassigning client device n 140-n to a different edge process or edge device, etc.

Referring back to FIG. 6, in step 14, the edge device 125 obtains the content in encrypted form and re-packages the encrypted content in a format suitable for the client device 140 (e.g., re-packaging the packets from another format into RTP packets) without re-encrypting one or more portions of the media content item. In step 15, in some embodiments, the edge device 125 sends the key ladder keys (e.g., $EK_0$, $EK_1$, ...) to the client device 140 in-band in the RTP stream, e.g., immediately before the encrypted content packets. Sending the key ladder keys in-band allows seamless transitions between different pieces of content, e.g., between adaptive bitrate (ABR) videos or between UI and an ABR video. In step 16, the client device 140 obtains the keys from the stream and loads the keys into its key ladder, as described above with reference to FIG. 2. In step 17, the client device 140 further obtains the content from the stream and decrypts the content using the key ladder keys. As such, the content in its original encryption from the content store can be decrypted by the client device 140. Packaging the content in a different format without re-encrypting the content on the edge device 125 allows the edge process to be lightweight since re-encryption is resource intensive.

Figure 9:
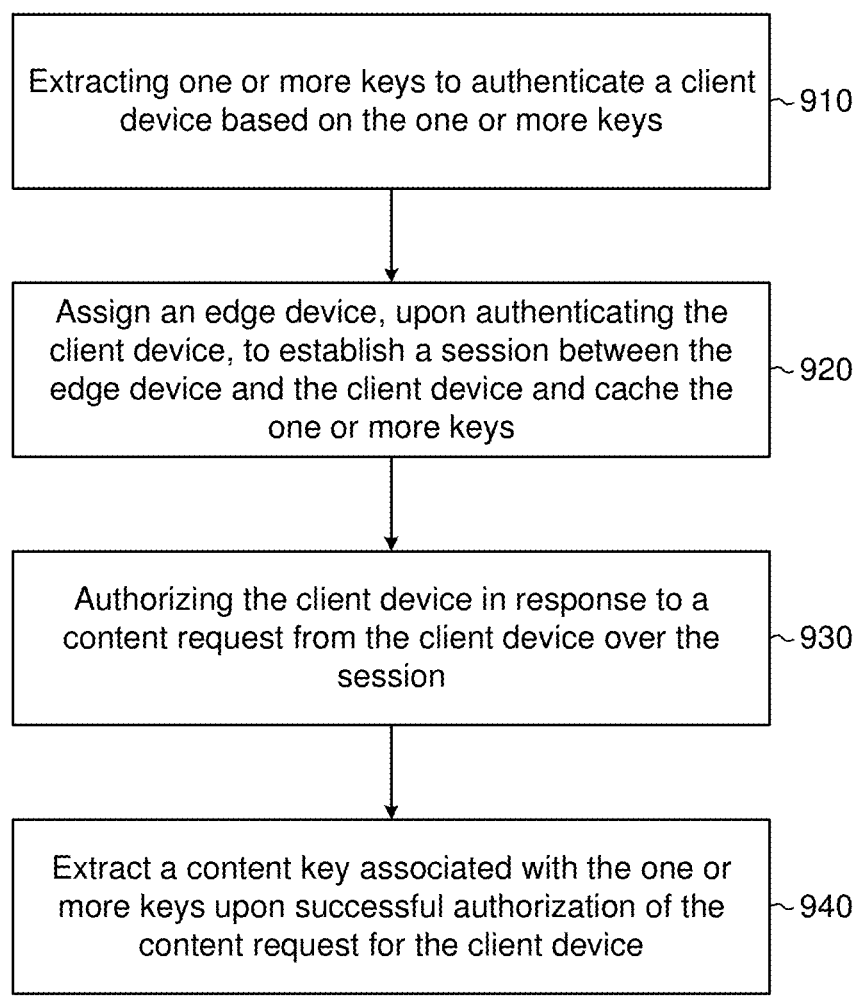
FIG. 9 is a flowchart illustrating the cloud using keys to facilitate authenticating and authorizing a thin client, in accordance with some embodiments.

FIG. 9 is a flowchart illustrating a method 900 of using keys to facilitate authenticating and authorizing a thin client device in accordance with some embodiments. In some embodiments, the method 900 is performed at one or more servers in a cloud including one or more processors and a non-transitory memory, e.g., the cloud computing platform 110 in FIGS. 1-2, 5, 7A-7B, and 8, which includes one or more servers as the device management unit 10, the user management unit 30, the UI engine 40, the device authentication unit 50, the authorization unit 60, and/or the signaling controller 80, and a non-transitory memory as one or more storage devices hosting the device database 20, the DRM keystore 70, the sessions data store 510 (FIG. 5), and/or the subscriber data store 710 (FIGS. 7A and 7B).

The method 900 begins with the cloud computing platform extracting one or more keys and authenticating a client device based on the one or more keys, as represented by block 910. For example, in FIG. 3, the cloud computing platform extracts key ladder keys and uses a challenge response protocol to authenticate the client device 140 before granting and sending an access token to the client device 140. As described above with reference to FIG. 3, in some embodiments, the challenge is a key ladder challenge generated based on a secret embedded in the key ladder. Also as shown in FIG. 4, the signaling controller 80 validates the access token in response to a connection request from the client device 140 and extracts high level key ladder keys (e.g., $EK_1$, $EK_2$, ...) upon successful validation.

The method 900 continues with the cloud computing platform assigning an edge device, upon authenticating the client device, to establish a session between the edge device and the client device and cache the one or more keys, as represented by block 920. For example, in step 7 of FIG. 4, the signaling controller 80 issues a command to the edge device 125 to create a session and sends the device ID of the client device along with the high order key ladder keys. The edge device 125, upon receiving the high order key ladder keys, caches the keys in step 8 and the session is established between the edge device 125 and the client device 140 in step 9.

The method 900 also includes authorizing the client device in response to a content request from the client device over the session, as represented by block 930. For example, in step 1 of FIG. 6, the client device sends a content request to the assigned edge device 125. Further, as shown in FIG. 6, the cloud computing platform (e.g., with the device management unit 10, the user management unit 30, and/or the DRM keystore 70), in response to receiving the content request, authorizes the content request by checking whether the client is entitled to the content in steps 2-4.

The method 900 additionally includes extracting a content key associated with the one or more keys upon successful authorization of the content request for the client device, as represented by block 940. For example, in FIG. 6, upon identifying the entitlement information and success authorization by the user management unit 30 in step 6, the device management unit 10 extracts the content key, e.g., the low level key ladder key $K_0$, from the DRM key store 70 and encrypts the content key in step 10 before sending the encrypted content key to the edge device 125, which subsequently packages the key ladder keys along with encrypted content to send to the client device 140.

Using the authentication and authorization method 900, the cloud computing platform provides strong security in a hyperscale environment. In particular, the cloud computing platform uses keys (e.g., as shown in FIG. 2) to facilitate authenticating and authorizing a thin client device according to extensible business models defined in the cloud. When a client device requests a connection (e.g., as shown in FIG. 4), upon successful authentication (e.g., as shown in FIGS. 3 and 4), the cloud computing platform utilizes key ladder keys for secure session establishment between an edge device and the client device in accordance with some embodiments. The high level key ladder keys are securely generated and maintained by the cloud according to extensible business models defined in the cloud (e.g., as shown in FIG. 4). Because an assigned edge process serves one or a few client devices, the caching of high level key ladder keys (e.g., as shown in FIG. 2) is simple and lightweight and minimizes the delays when switching between media content items. During the session establishment, the cloud can detect clone devices (e.g., as shown in FIGS. 4 and 5) and revoke services. Once the secure session is established, the content key is requested when the content is requested (e.g., as shown in FIG. 6). As such, because the authorization is performed in real time, e.g., applying the business models at the time the content is requested, and the client device is not aware of business rules or the authorization check, the security framework is extensible and flexible (e.g., as shown in FIGS. 7A and 7B), thus enhancing security for thin client devices.

Figure 10:
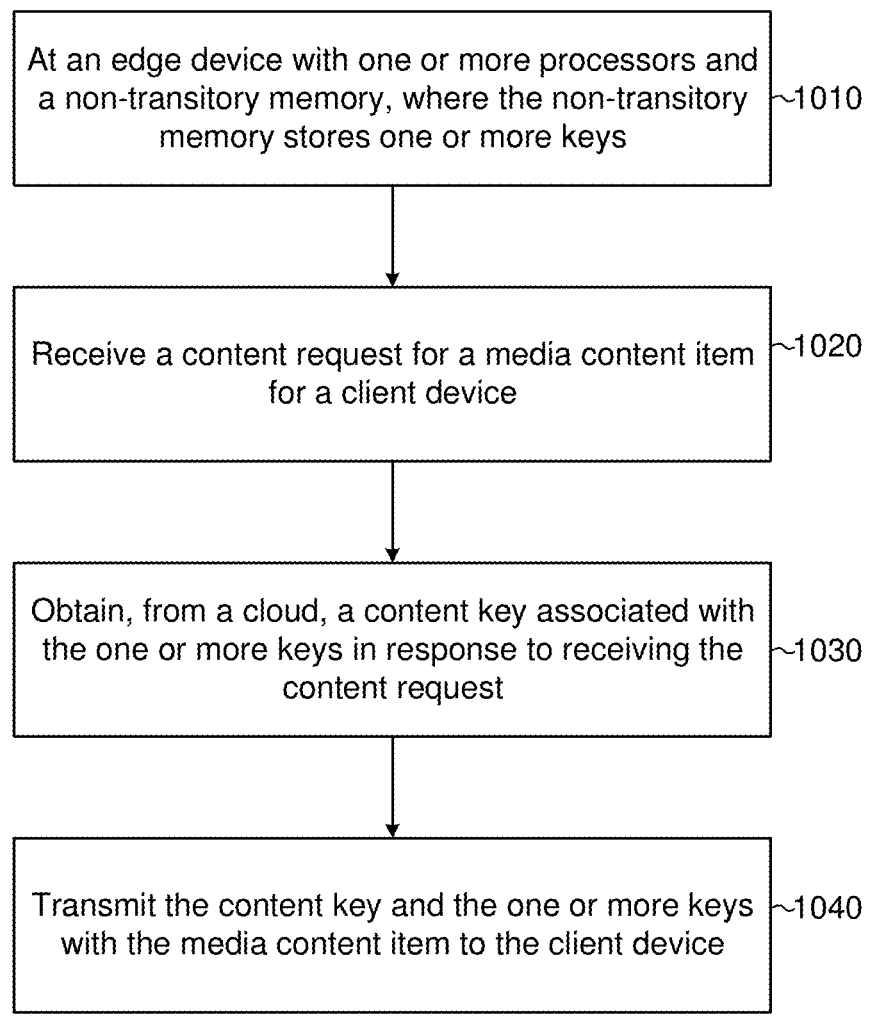
FIG. 10 is a flowchart illustrating the edge using keys provided by the cloud for content protection, in accordance with some embodiments.

FIG. 10 is a flowchart illustrating a method 1000 of using keys provided by the cloud for content protection, in accordance with some embodiments. In some embodiments, the method 1000 is performed at an edge device (e.g., the edge device 125 in FIGS. 1-2, 4-6, 7A-7B, and 8) with one or more processors (e.g., including instructions for the watermark sequencer 130 in FIGS. 1 and 8) and a non-transitory memory, where the non-transitory memory stores one or more keys (e.g., the non-transitory memory as the cache 132 in FIGS. 1-2 and 7A-7B for storing the high level key ladder keys, $E_1$, $E_2$, ...).

The method 1000 starts with the edge device receiving a content request for a media content item for a client device (e.g., the client device 140 sending the content request to the edge device 125 in step 1 of FIG. 6), as represented by block 1010. The method 1000 continues, as represented by block 1020, with the edge device obtaining from a cloud a content key associated with the one or more keys in response to receiving the content request, e.g., the edge device 125 requesting and obtaining $EK_0$ from the cloud in steps 2-10 of FIG. 6. As represented by block 1030, the method 1000 further includes transmitting the content key and the one or more keys with the media content item to the client device (e.g., as shown in step 15 of FIG. 6).

Following the steps in the method 1000, the edge obtains from the cloud the low level key ladder key when the client device requests the content. This allows access conditions to be checked at the time of access, thus enabling immediate subscription upgrades and fast revocation of permission to content. Further, utilizing the key ladder keys, the cloud performs resource intensive tasks such as encryption, key generation, authentication, and/or authorization, while the edge packages the content and the encrypted key without decryption, encryption, and/or re-encryption at the edge, thus lowering the cost of edge computing.

Figure 11:
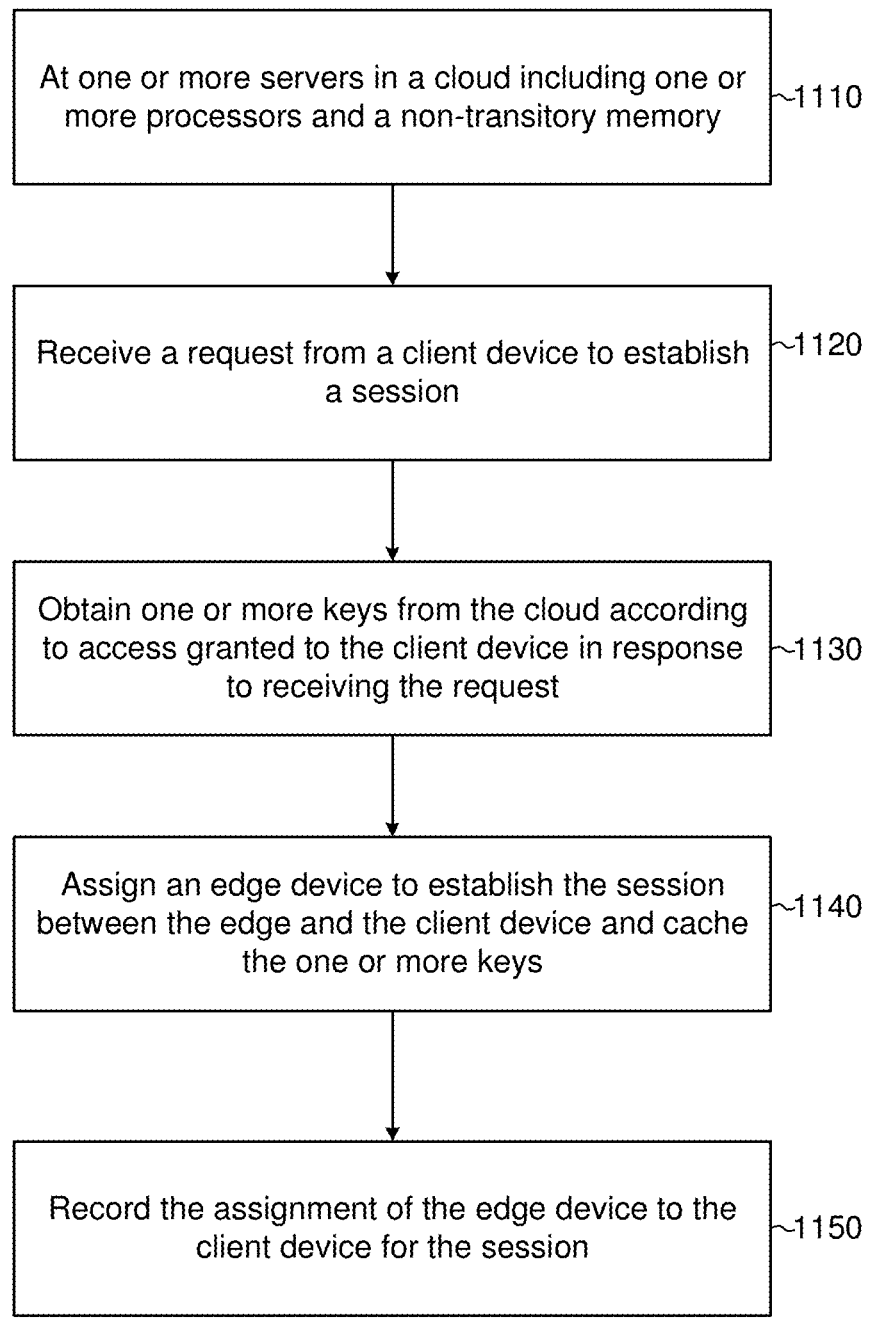
FIG. 11 is a flowchart illustrating utilizing keys for secure session establishment, in accordance with some embodiments.

FIG. 11 is a flowchart illustrating a method 1100 of using keys to facilitate secure session establishment in accordance with some embodiments. In some embodiments, as represented by block 1110, the method 1100 is performed at one or more servers in a cloud including one or more processors and a non-transitory memory, e.g., the signaling controller 80 in FIGS. 1 and 4-5 with the sessions data store 510 in FIG. 5. The method 1100 starts with the signaling controller receiving a request from a client device to establish a session, as represented by block 1120, e.g., the signaling controller 80 receiving the connection request from the client device 140 in step 1 of FIG. 4. The method 1100 continues, as represented by block 1130, with the signaling controller obtaining one or more keys from the cloud according to access granted to the client device in response to receiving the request, e.g., the signaling controller 80 obtaining $EK_1$, $EK_2$, . . . in steps 5 and 6 of FIG. 4 upon validating the access token that is granted to the client device upon successful authentication, wherein the device management unit 10 extracts the high level key ladder keys $EK_1$, $EK_2$, . . . associated with the device ID.

As represented by block 1140, the method 1100 further includes assigning an edge device to establish the session between the edge and the client device and cache the one or more keys, e.g., as shown in steps 7 and 8 of FIG. 4. As represented by block 1150, the method 1100 also includes recording the assignment of the edge device to the client device for the session. For example, as shown in FIG. 5, the signaling controller 80 records the assignment of edge 1 to client 1 for session 1 in the sessions data store 510 after an active session is set up between the edge device 125 and client device 1 in step 1. Further as shown in FIG. 5, using the active session information stored in the session data store 510, the system detects potential attacks such as cloning and/or impersonation and terminating the existing session to stop potential theft of services and/or content.

Figure 12:
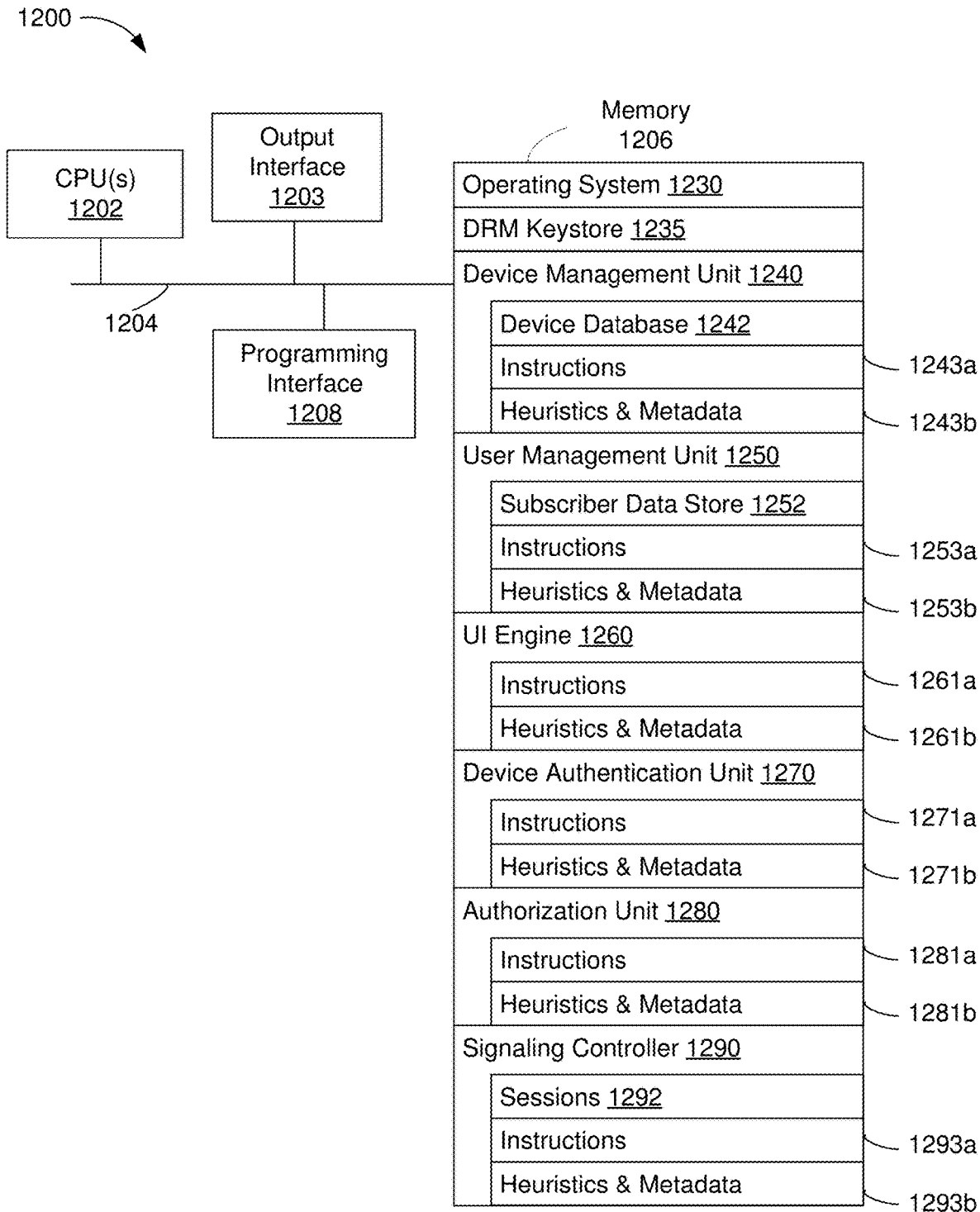
FIG. 12 is a block diagram of a computing device, in accordance with some embodiments.

FIG. 12 is a block diagram of a computing device 1200 in accordance with some embodiments. In some embodiments, the computing device 1200 corresponds to one or more servers in the cloud computing platform 110 in FIG. 1 and performs one or more of the functionalities described above with respect to the cloud computing platform 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1200 includes one or more processing units (CPU's) 1202 (e.g., processors and/or controllers), one or more output interfaces 1203 (e.g., a network interface), a memory 1206, a programming interface 1208, and one or more communication buses 1204 for interconnecting these and various other components.

In some embodiments, the communication buses 1204 include circuitry that interconnects and controls communications between system components. The memory 1206 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 1206 optionally includes one or more storage devices remotely located from the CPU(s) 1202. The memory 1206 comprises a non-transitory computer readable storage medium. Moreover, in some embodiments, the memory 1206 or the non-transitory computer readable storage medium of the memory 1206 stores the following programs, modules and data structures, or a subset thereof including an optional operating system 1230, a DRM key store 1235, a device management unit 1240, a user management unit 1250, a UI engine 1260, a device authentication unit 1270, an authorization unit 1280, and a signaling controller 1290. In some embodiments, one or more instructions are included in a combination of logic and non-transitory memory. The operating system 1230 includes procedures for handling various basic system services and for performing hardware dependent tasks.

In some embodiments, the DRM keystore 1235 (e.g., the DRM keystore 70, FIG. 1) stores and maintains DRM keys for DRM protected content, e.g., storing content keys based on content IDs.

In some embodiments, the device management unit 1240 (e.g., the device management unit 10, FIG. 1) is configured to manage the client devices, generate keys, and/or store information about the client devices in a device database 1242 (e.g., the device database 20, FIG. 1). To that end, the device management unit 1240 includes a set of instructions 1243a and heuristics and metadata 1243b.

In some embodiments, the user management unit 1250 (e.g., the user management unit 30, FIG. 1) is configured to manage registered users (e.g., subscribers) and store the subscriber information in a subscriber data store 1252 (e.g., the subscriber data store 710, FIGS. 7A and 7B). To that end, the user management unit 1250 includes a set of instructions 1253a and heuristics and metadata 1253b.

In some embodiments, the UI engine 1260 (e.g., the UI engine 40, FIG. 1) is configured to generate and provide UIs. To that end, the UI engine 1260 includes a set of instructions 1261a and heuristics and metadata 1261b.

In some embodiments, the device authentication unit 1270 (e.g., the device authentication unit 50, FIG. 1) is configured to use a secret in a challenge response protocol to authenticate the client device. To that end, the device authentication unit 1270 includes a set of instructions 1271a and heuristics and metadata 1271b.

In some embodiments, the authorization unit 1280 (e.g., the authorization unit 60, FIG. 1) is configured to grant to the client devices authorizations to access services and/or content. To that end, the authorization unit 1280 includes a set of instructions 1281a and heuristics and metadata 1281b.

In some embodiments, the signaling controller 1290 (e.g., the signaling controller 80, FIG. 1) is configured to communicate signaling and control information and store the session information in sessions 1292 (e.g., the sessions data store 510, FIG. 5). To that end, the signaling controller 1290 includes a set of instructions 1293a and heuristics and metadata 1293b.

Although the DRM key store 1235, the device management unit 1240, the user management unit 1250, the UI engine 1260, the device authentication unit 1270, the authorization unit 1280, and the signaling controller 1290 are illustrated as residing on a single computing device 1200 (e.g., a single server), it should be understood that in other embodiments, any combination of the DRM key store 1235, the device management unit 1240, the user management unit 1250, the UI engine 1260, the device authentication unit 1270, the authorization unit 1280, and the signaling controller 1290 can reside in separate computing devices (e.g., separate servers) in various embodiments. For example, in some embodiments each of the DRM key store 1235, the device management unit 1240, the user management unit 1250, the UI engine 1260, the device authentication unit 1270, the authorization unit 1280, and the signaling controller 1290 reside on a separate computing device.

Moreover, FIG. 12 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 12 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 13:
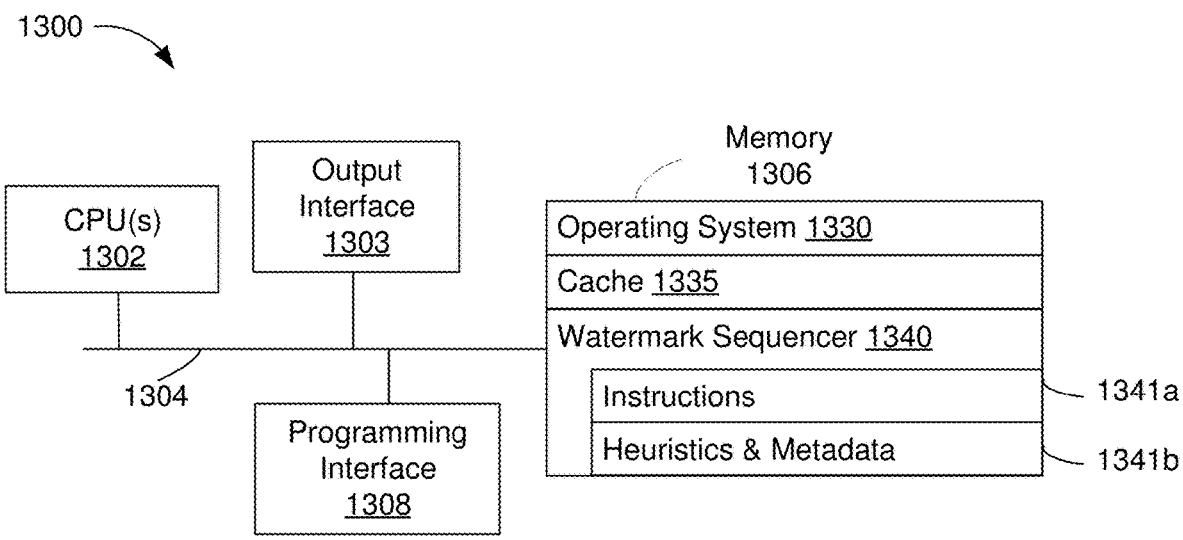
FIG. 13 is a block diagram of another computing device, in accordance with some embodiments.

FIG. 13 is a block diagram of a computing device 1300 in accordance with some embodiments. In some embodiments, the computing device 1300 corresponds to the edge device 125 of FIG. 1 and performs one or more of the functionalities described above with respect to the edge device 125. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1300 includes one or more processing units (CPU's) 1302 (e.g., processors and/or controllers), one or more output interfaces 1303 (e.g., a network interface), a memory 1306, a programming interface 1308, and one or more communication buses 1304 for interconnecting these and various other components.

In some embodiments, the communication buses 1304 include circuitry that interconnects and controls communications between system components. The memory 1306 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 1306 optionally includes one or more storage devices remotely located from the CPU(s) 1302. The memory 1306 comprises a non-transitory computer readable storage medium. Moreover, in some embodiments, the memory 1306 or the non-transitory computer readable storage medium of the memory 1306 stores the following programs, modules and data structures, or a subset thereof including an optional operating system 1330, a cache 1335, and a watermark sequencer 1340. In some embodiments, one or more instructions are included in a combination of logic and non-transitory memory. The operating system 1330 includes procedures for handling various basic system services and for performing hardware dependent tasks.

In some embodiments, the cache 1335 (e.g., the cache 132, FIG. 1) caches content and/or decryption keys for client devices.

In some embodiments, the watermark sequencer 1340 (e.g., the watermark sequencer 130, FIG. 1) is configured to embed watermarks. To that end, the watermark sequencer 1340 includes a set of instructions 1341a and heuristics and metadata 1341b.

Although the cache 1335 and the watermark sequencer 1340 are illustrated as residing on a single computing device 1300, it should be understood that in other embodiments, any combination of the cache 1335 and the watermark sequencer 1340 can reside in separate computing devices in various embodiments. For example, in some embodiments each of the cache 1335 and the watermark sequencer 1340 reside on a separate computing device.

Moreover, FIG. 13 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 13 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations

The invention claimed is:

1. A method comprising:
at one or more servers in a cloud including one or more processors and a non-transitory memory:
extracting one or more keys associated with a client device and authenticating the client device based on the one or more keys;
assigning an edge device, upon authenticating the client device, to serve the client device and facilitating establishment of a session between the edge device and the client device for sending the one or more keys to the edge device to be cached on the edge device, wherein the one or more servers store records in the non-transitory memory representing assigning the session to the client device;
authorizing the client device in response to a content request from the client device over the session;
extracting a content key associated with the one or more keys upon successful authorization of the content request for the client device; and
sending to the client device, via the edge device and over the session, the content key and causing the edge device to send along the one or more keys cached by the edge device.

2. The method of claim 1, further comprising recording the assignment of the edge device to the client device for the session in the non-transitory memory.

3. The method of claim 1, wherein:
the one or more keys and the content key are key ladder keys;
the one or more keys are generated by the cloud according to an entitlement associated with the client device; and
the content key is generated by the cloud based at least in part on a content identifier in the content request.

4. The method of claim 1, further comprising:
granting and sending an access token to the client device upon authenticating the client device; and
validating the access token prior to assigning the edge device for establishing the session.

5. The method of claim 1, wherein authenticating the client device based on the one or more keys includes authenticating the client device using a secret associated with the one or more keys, and the method further includes:
storing the secret in the non-transitory memory, separate from the one or more keys and the content key.

6. The method of claim 5, wherein the secret associated with the one or more keys includes a signed challenge and an expected response, and authenticating the client device using the secret includes:
sending the signed challenge to the client device;
obtaining from the client device a response and the signed challenge; and
validating the signed challenge and validating the response by comparing the response with the expected response.

7. The method of claim 1, wherein authenticating the client device is triggered by one or more of the client devices changing a pairing display device, time elapsed since a previous authentication exceeding a threshold, the client device presenting an invalid token, the client device requesting a duplicate session, and an authentication request.

8. The method of claim 1, further comprising:
determining whether an active session exists for the client device; and
terminating the active session in accordance with a determination that the active session exists for the client device.

9. The method of claim 8, wherein:
the non-transitory memory stores assignments of active sessions; and
determining whether the active session exists for the client device includes determining, based on an identifier associated with the client device, whether an active edge device has been assigned to the client device according to the assignments of the active sessions.

10. The method of claim 1, wherein authorizing the client device in response to the content request from the client device over the session includes:
updating an entitlement of the client device, to a media content item referenced in the content request; and
re-authorizing the client device based on the updated entitlement of the client device in response to the content request from the client device over the session.

11. The method of claim 1, wherein authorizing the client device in response to the content request is performed according to models for each subscriber, including one or more of tiers, rental privileges, loan limits, online purchase agreements, and gift amount.

12. The method of claim 1, further comprising:
tracing the edge device as compromised, including identifying an edge identifier associated with the edge device in multiple copies of a media content item, wherein the content request references the media content item and each of the multiple copies has a client identifier associated with a respective client device and the edge identifier embedded as watermarks.

13. A method comprising:
at an edge device with one or more processors and a non-transitory memory:
obtaining instructions from a cloud to establish a session to serve the client device upon the cloud authenticating the client device, including receiving from the cloud the one or more keys to be cached in the non-transitory memory, wherein the cloud stores records representing assigning the session to the client device;
receiving a content request for a media content item from the client device;
obtaining, from the cloud, a content key associated with the one or more keys in response to receiving the content request; and transmitting the content key, the one or more keys, and the media content item to the client device over the session to trigger decryption of the media content item at the client device using the content key and the one or more keys.

14. The method of claim 13, further comprising:
generating watermarked content for the media content item by embedding at least a client identifier associated with the client device in the media content item, and
wherein transmitting the content key and the one or more keys with the media content item to the client device includes transmitting the content key and the one or more keys with the watermarked content to the client device.

15. The method of claim 13, wherein:
the content request for the media content item includes a content identifier; and
obtaining, from the cloud, the content key includes:
sending, to the cloud, the content identifier and a client identifier associated with the client device, wherein the cloud determines an entitlement to the media content item for the client device based on the content identifier and the client identifier, and in accordance with a determination that the client device is entitled to the media content item, the cloud generates the content key based on the client identifier and the content identifier and encrypts the content key before sending the content key to the edge device.

16. The method of claim 13, further comprising:
using an active session recorded in the non-transitory memory for the receiving, obtaining, and transmitting steps, wherein the active session is established upon the cloud assigning the edge device to the client device for the active session and sending the edge device the one or more keys for caching.

17. The method of claim 13, further comprising:
obtaining the media content item, wherein the media content is encrypted and in a first format; and
packaging the media content item without re-encrypting one or more portions of the media content item in a second format for transmission, wherein the second format is different from the first format.

18. The method of claim 13, wherein transmitting the content key, the one or more keys, and the media content item to the client device includes transmitting the content key and the one or more keys in-band with the media content item in a stream, and the stream includes the content key and the one or more keys followed by the media content item.

19. The method of claim 18, further comprising:
causing the client device to obtain the content key and the one or more keys from the stream and use the content key and the one or more keys to decrypt the media content item.

20. A system comprising:
one or more servers in a cloud configured to:
extract one or more keys associated with a client device and authenticate the client device based on the one or more keys;
assign an edge device, upon authenticating the client device, to serve the client device and facilitate establishment of a session between the edge device and the client device for sending the one or more keys to the edge device to be cached on the edge device, wherein the one or more servers store records representing assigning the session to the client device;
authorize the client device in response to a content request from the client device over the session;
extract a content key associated with the one or more keys upon successful authorization of the content request for the client device; and
send to the client device, via the edge device and over the session, the content key and cause the edge device to send along the one or more keys cached by the edge device and
the edge device including one or more processors and a non-transitory memory for storing the one or more keys, and the edge device is configured to:
obtain instructions from the cloud to establish the session to serve the client device upon the cloud authenticating the client device, including receiving from the cloud the one or more keys to be cached in the non-transitory memory;
receive the content request for a media content item from the client device;
obtain from the cloud the content key associated with the one or more keys in response to receiving the content request; and
transmit the content key, the one or more keys, and the media content item to the client device over the session to trigger decryption of the media content item at the client device using the content key and the one or more keys.

* * * * *